US011077589B2

(12) United States Patent
Tanabe et al.

(10) Patent No.: US 11,077,589 B2
(45) Date of Patent: Aug. 3, 2021

(54) MANUFACTURING METHOD OF MOLDED ARTICLE, MOLDED ARTICLE, BAND AND TIMEPIECE

(71) Applicant: CASIO COMPUTER CO., LTD., Tokyo (JP)

(72) Inventors: Kazuyuki Tanabe, Koshu (JP); Masato Ueno, Tama (JP)

(73) Assignee: CASIO COMPUTER CO., LTD., Tokyo (JP)

(*) Notice: Subject to any disclaimer, the term of this patent is extended or adjusted under 35 U.S.C. 154(b) by 133 days.

(21) Appl. No.: 16/297,638

(22) Filed: Mar. 9, 2019

(65) Prior Publication Data
US 2019/0283293 A1 Sep. 19, 2019

(30) Foreign Application Priority Data
Mar. 14, 2018 (JP) .............................. JP2018-04715 8

(51) Int. Cl.
B29C 43/14 (2006.01)
B29C 45/14 (2006.01)
(Continued)

(52) U.S. Cl.
CPC ...... B29C 45/14221 (2013.01); A44C 5/0053 (2013.01); B29C 43/14 (2013.01);
(Continued)

(58) Field of Classification Search
CPC . B29C 43/36; B29C 2043/3665; B29C 45/03; B29C 45/04; B29C 45/14;
(Continued)

(56) References Cited

U.S. PATENT DOCUMENTS 8,613,544 B2 * 12/2013 Kitahara ................. B29C 70/70
368/282
2019/0022912 A1 * 1/2019 Rannoux ............... B29C 48/304

FOREIGN PATENT DOCUMENTS

JP 07008308 1/1995
JP H1044190 A 2/1998
(Continued)

OTHER PUBLICATIONS

Chinese Office Action (and English language translation thereof) dated Nov. 30, 2020 issued in Chinese Application No. 201910194520. 3.

(Continued)

Primary Examiner — Joseph S Del Sole
Assistant Examiner — Thu Khanh T Nguyen
(74) Attorney, Agent, or Firm — Holtz, Holtz & Volek PC

(57) ABSTRACT

A manufacturing method of a molded article, including a first step of arranging a primary molded article made of a soft material in a molding die such that an outer peripheral surface of an exposed section of the primary molded article which is exposed to an outside without being embedded in a secondary molded article corresponds to an inner peripheral surface of the molding die, a second step of pressing and deforming an outer peripheral portion of the primary molded article arranged in the molding die by a pressing section so as to bring the outer peripheral surface of the exposed section into close contact with the inner peripheral surface of the molding die, and a third step of molding the secondary molded article by withdrawing the pressing section from inside the molding die while injecting resin to be the secondary molded article into the molding die.

16 Claims, 10 Drawing Sheets

(51) Int. Cl.
*A44C 5/00* (2006.01)
*B29L 29/00* (2006.01)

(52) U.S. Cl.
CPC .......... *B29C 45/14* (2013.01); *B29C 45/1418* (2013.01); *B29C 45/14819* (2013.01); *B29L 2029/00* (2013.01)

(58) Field of Classification Search
CPC ........ B29C 45/14008; B29C 45/14827; B29C 45/1418; B29C 45/14204; B29C 45/14811; B29C 70/00; B29C 70/40; B29C 70/72; B29C 70/745; B29C 70/76; B29C 70/80
See application file for complete search history.

(56) References Cited

FOREIGN PATENT DOCUMENTS

| | | |
|---|---|---|
| JP | H1115614 A | 1/1999 |
| JP | 2001024343 A | 1/2001 |
| JP | 2004216855 A | 8/2004 |
| JP | 2007001158 A | 1/2007 |

OTHER PUBLICATIONS

Japanese Office Action (and English language translation thereof) dated Jan. 22, 2020 issued in Japanese Application No. 2018-047158.

* cited by examiner

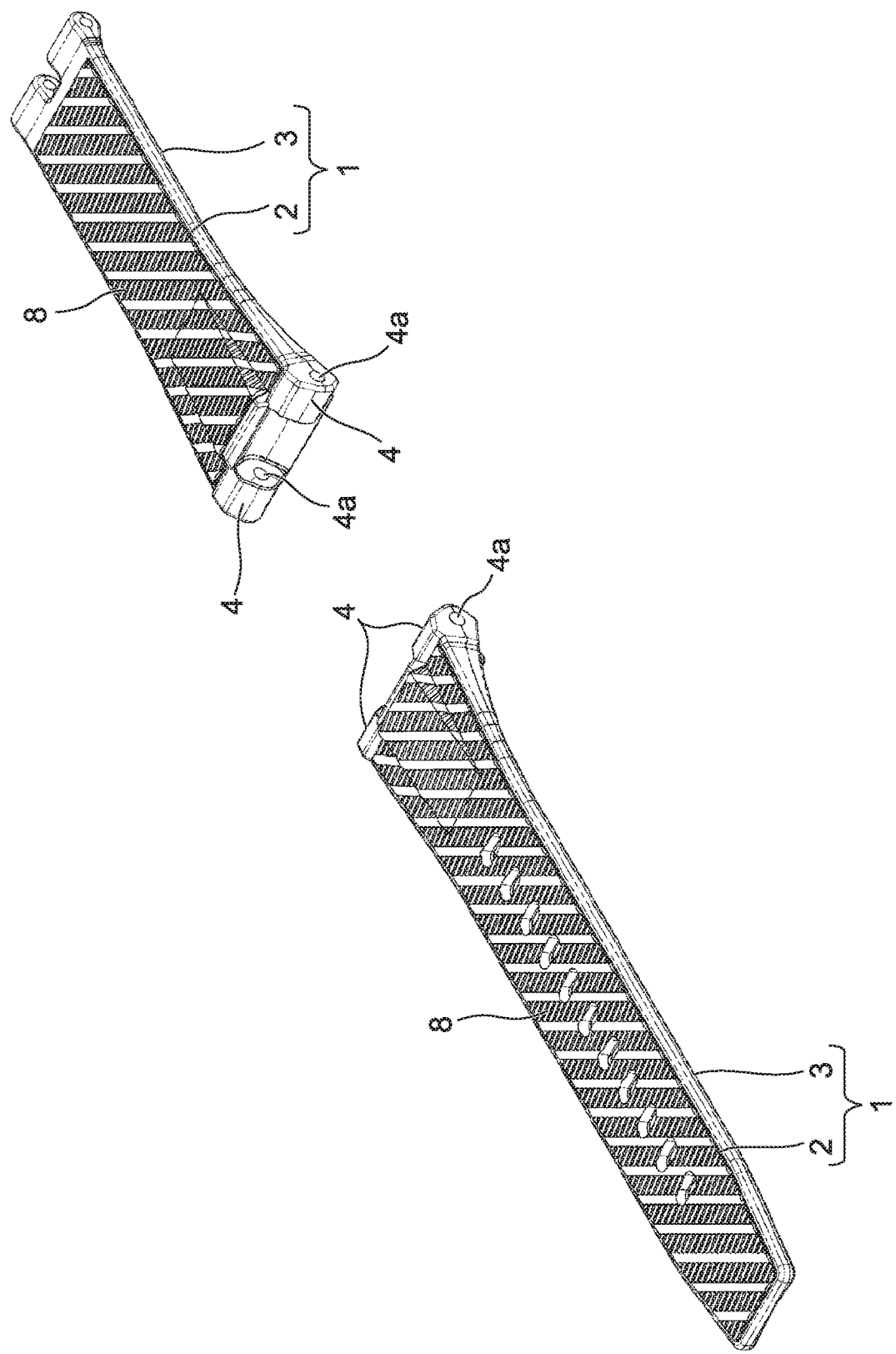

MANUFACTURING METHOD OF MOLDED ARTICLE, MOLDED ARTICLE, BAND AND TIMEPIECE

CROSS-REFERENCE TO RELATED APPLICATION

This application is based upon and claims the benefit of priority from the prior Japanese Patent Application No. 2018-047158, filed Mar. 14, 2018, the entire contents of which are incorporated herein by reference.

BACKGROUND

1. Field of the Invention

The present invention relates to a manufacturing method of a molded article such as a band for a wristwatch, a briefcase, a handbag or the like, a molded article, a band, and a timepiece including the band.

2. Description of the Related Art

For example, a manufacturing method of a wristwatch band is known in which a primary molded article made of a soft synthetic resin is placed in a molding die, and resin for a secondary molded article is injected into the molding die in this state so as to mold the secondary molded article, whereby the primary molded article and the secondary molded article are integrally formed by insert molding, as described in Japanese Patent Application Laid-Open (Kokai) Publication No. 2001-024343.

In such a manufacturing method of a band, if there is a space between the outer peripheral surface of the primary molded article and the inner peripheral surface of the molding die that corresponds to the outer peripheral surface when the primary molded article is placed in the molding die so as to mold the secondary molded article, the resin for the secondary molded article flows into this space and thereby burrs occur. Also, in such a manufacturing method, if the outer peripheral surface of the primary molded article is larger than the inner peripheral surface of the molding die, the primary molded article does not fit into the molding die and undesirably rides on the molding die. Further, this is also undesirable in terms of appearance and design.

SUMMARY

In accordance with one embodiment there is provided a manufacturing method of a molded article, comprising: a first step of arranging a primary molded article made of a soft material in a molding die such that an outer peripheral surface of an exposed section of the primary molded article which is exposed to outside without being embedded in a secondary molded article corresponds to an inner peripheral surface of the molding die; a second step of pressing and deforming an outer peripheral portion of the primary molded article arranged in the molding die by a pressing section so as to bring the outer peripheral surface of the exposed section into close contact with the inner peripheral surface of the molding die; and a third step of molding the secondary molded article by withdrawing the pressing section from inside the molding die while injecting resin to be the secondary molded article into the molding die.

In accordance with another aspect of the present invention, there is provided a molded article comprising: a primary molded article which is made of a soft material and includes an exposed section and an embedded section; and a secondary molded article in which the embedded section of the primary molded article is embedded with the exposed section being exposed and which has shoulder sections that laterally project outside an outer periphery of the primary molded article, wherein upper surface portions of the shoulder sections of the secondary molded article on the exposed section side coincide with boundary portions between an outer peripheral surface of the exposed section and an outer peripheral surface of the embedded section in the primary molded article.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 1 is a perspective view showing an embodiment in which the present invention has been applied to bands of a wristwatch;

DETAILED DESCRIPTION OF THE PREFERRED EMBODIMENTS

An embodiment applied to bands of a wristwatch will hereinafter be described with reference to FIG. 1 to FIG. 10.

Each of these bands 1 is in the form of a belt acquired by a primary molded article 2 being integrally molded with a secondary molded article 3 by insertion molding, as shown in FIG. 1 to FIG. 3B. These bands 1 are structured such that ends of the bands 1 in the longitudinal direction are attached to the 12 o'clock and 6 o'clock sides of a wristwatch case (not shown).

Figure 2A:
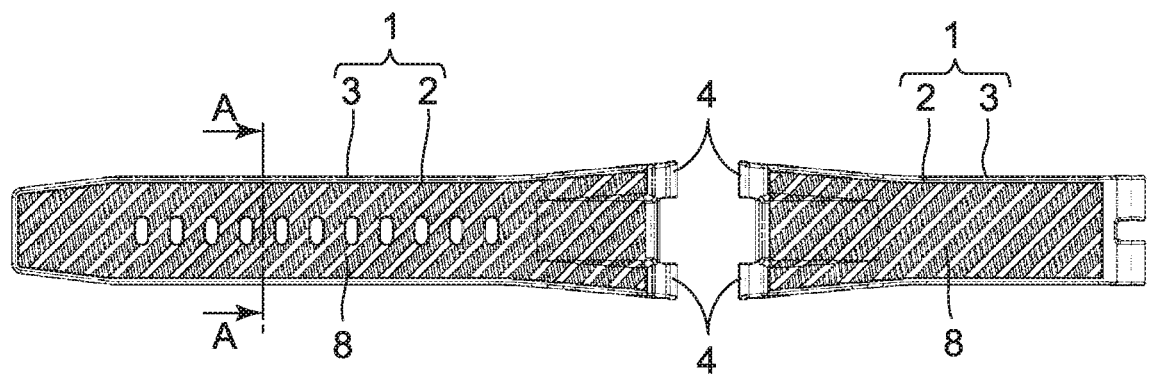
FIG. 2A is a front view of the bands shown in FIG. 1.
Figure 2B:
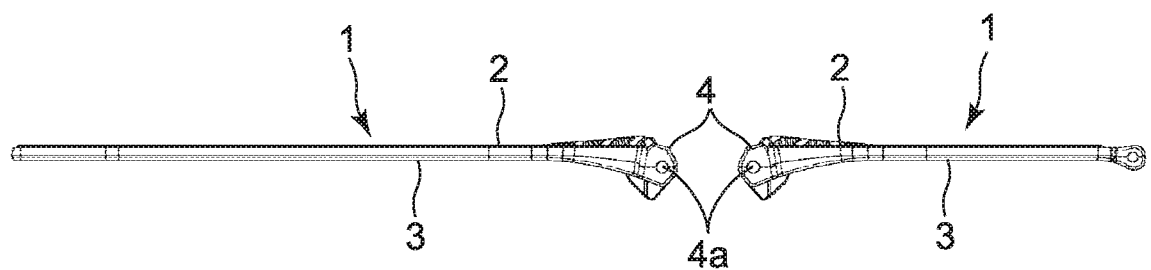
FIG. 2B is a side view of the bands shown in FIG. 1.
Figure 2C:
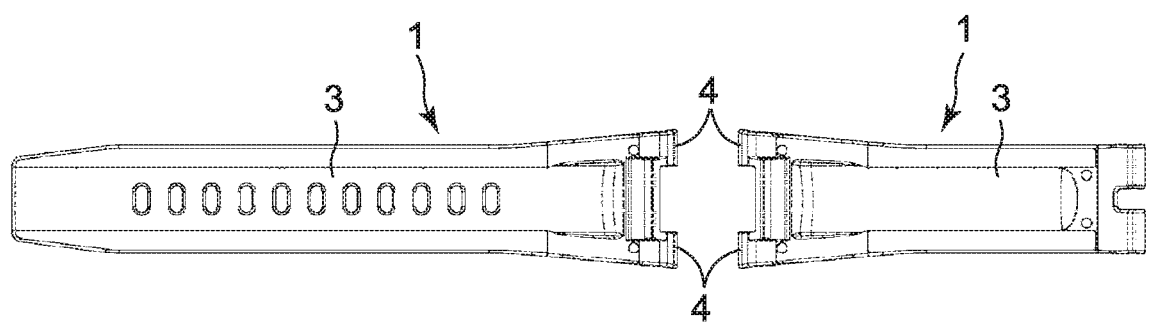
FIG. 2C is a rear view of the bands shown in FIG. 1.

In this embodiment, each primary molded article 2 has a belt shape and is made of a soft synthetic resin such as urethane resin, silicone resin, or an elastomer, as shown in FIG. 1 to FIG. 2B. On one end of the primary molded article 2 in the longitudinal direction, a band attachment section 4 is provided. The band attachment section 4 is thicker than the primary molded article 2 and has attachment holes 4a protruding through a central portion of the band attachment section 4 in the width direction that is orthogonal to the longitudinal direction. This band attachment section 4 is structured to be attached to the wristwatch case by a pin member (not illustrated) inserted into the attachment holes 4a.

Each secondary molded article 3 has a belt shape and is made of resin which is the same as that of each primary molded article 2 except its color, as shown in FIG. 1 to FIG. 3A. The length of this secondary molded article 3 in the width direction orthogonal to the longitudinal direction is slightly longer than the length of the corresponding primary molded article 2 in the width direction. Accordingly, when the primary molded article 2 is provided on the upper surface of the secondary molded article 3, the outer periphery of the secondary molded article 3 projects outside the outer periphery of the primary molded article 2. That is, the outer periphery of the secondary molded article 3 is provided with shoulder sections 5 that laterally project outside the outer periphery of the primary molded article 2.

Figure 3A:
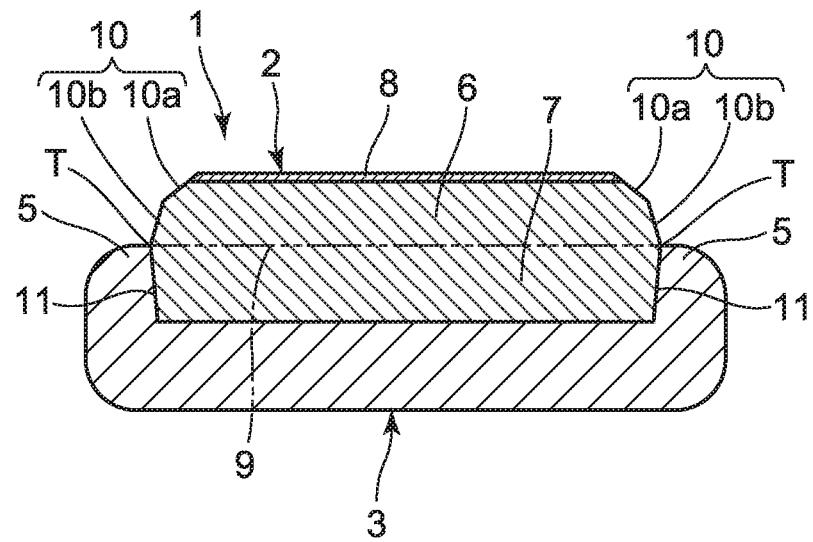
FIG. 3A is an enlarged sectional view showing one of the bands taken along line A-A in FIG. 2A.
Figure 3B:
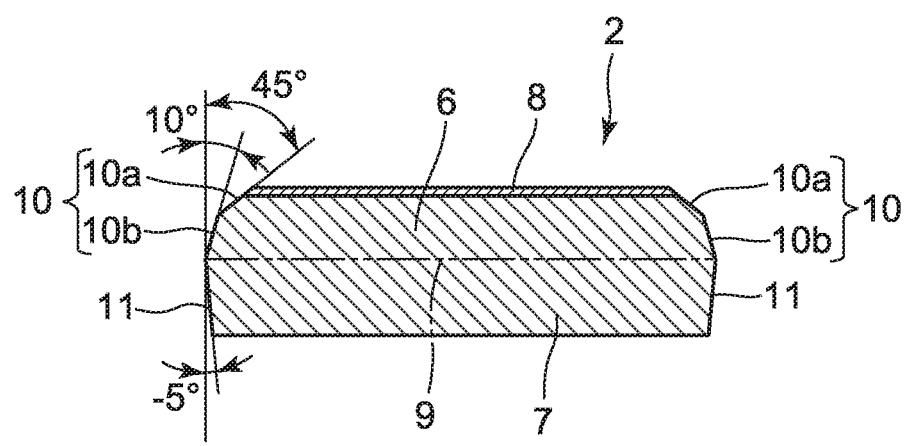
FIG. 3B is an enlarged sectional view showing a primary molded article of the hand of FIG. 3A taken along line A-A of FIG. 2A.

Also, each primary molded article 2 includes an exposed section 6 that is exposed by projecting from the upper surface of the corresponding secondary molded article 3 and an embedded section 7 that is embedded in the secondary molded article 3, as shown in FIG. 3A and FIG. 3B. The exposed section 6 and the embedded section 7 are formed such that their thicknesses in the vertical direction are substantially equal to each other. On the upper surface of the exposed section 6, a decorative layer 8 is provided by painting, printing or the like. Also, the thickness of each secondary molded article 3 and the thickness of each primary molded article 2 in the vertical direction are substantially equal to each other.

As a result, each band 1 is structured such that the primary molded article 2 and the secondary molded article 3 are integrally formed with upper surface portions of the shoulder sections 5 of the secondary molded article 3 on the exposed section 6 side coinciding with boundary portions T between the outer peripheral surface of the exposed section 6 and the outer peripheral surface of the embedded section 7 in the primary molded article 2, as shown in FIG. 3A. That is, each band 1 is structured such that the embedded section 7 is embedded in the secondary molded article 3 with an outer peripheral portion of the primary molded article 2 being vertically pressed and laterally expanded.

The outer peripheral portion of each primary molded article 2 is formed to have a shape by which it is easily expanded and deformed laterally when vertically pressed, as shown in FIG. 3B.

Figure 4:
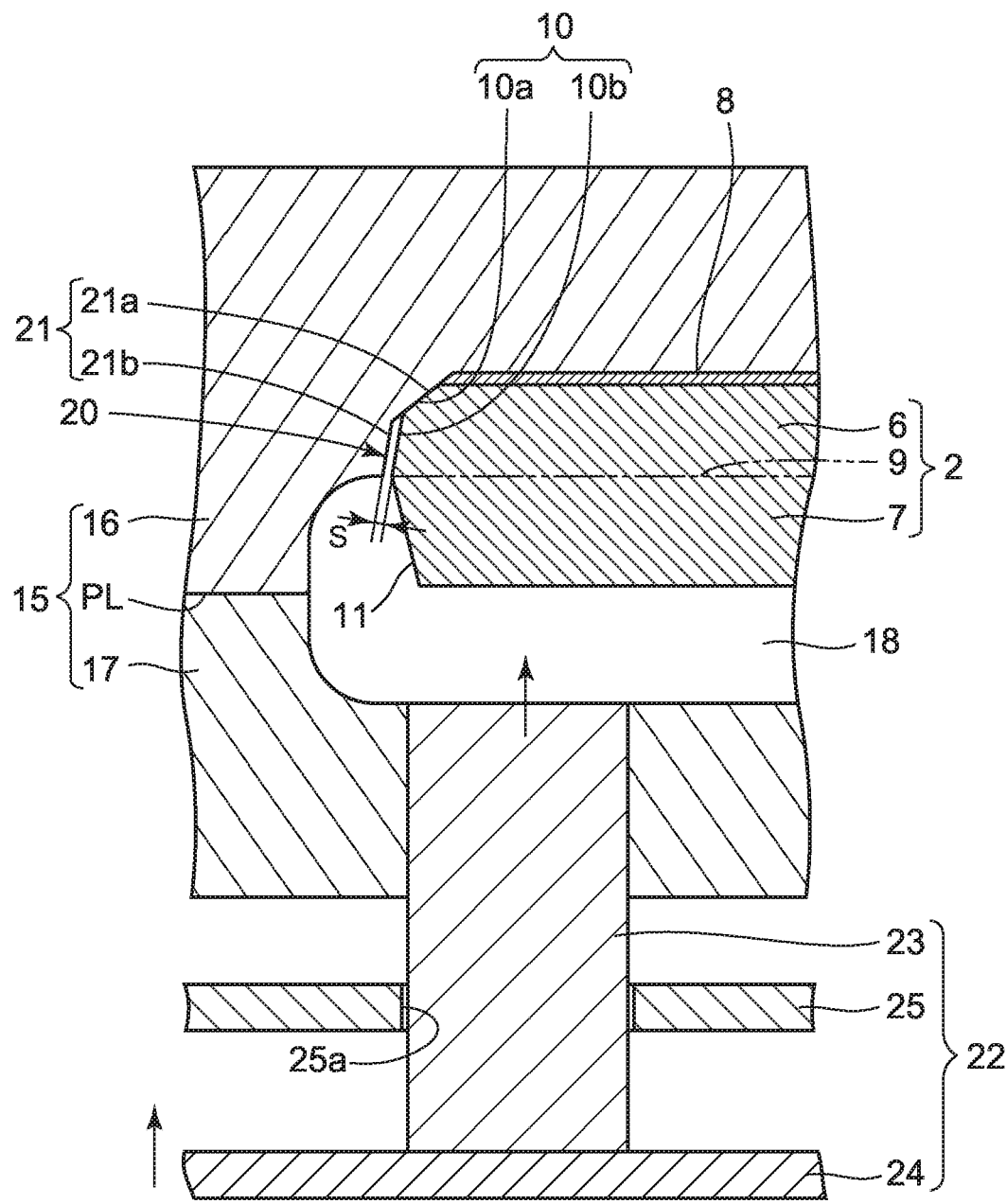
FIG. 4 is an enlarged sectional view of a main portion, which shows a state where the primary molded article of the band shown in FIG. 3B has been arranged in a molding die.

That is, the outer peripheral surface of each exposed section 6 is provided with first inclined sections 10, as shown in FIG. 3B. Also, the outer peripheral surface of each embedded section 7 is provided with second inclined sections 11 that are opposite in inclination to the first inclined sections 10 of the corresponding exposed section 6. Each first inclined section 10 of the exposed section 6 includes a first contact inclination surface 10a that is a draft for taking out the primary molded article 2 from inside the later-described molding die 15 and is a part of the outer peripheral surface of the exposed section 6 which comes in close contact with the inner peripheral surface of the molding die 15, and a second contact inclination surface 10b that is another part of the outer peripheral surface of the exposed section 6 which comes in close contact with the inner peripheral surface of the molding die 15 when an outer peripheral portion of the exposed section 6 is deformed, as shown in FIG. 4.

Here, each first contact inclination surface 10a is provided to be positioned on the upper side of the outer peripheral surface of the corresponding exposed section 6 and inclined at an angle of, for example, substantially 45 degrees with respect to a boundary surface 9 between the exposed section 6 and the corresponding embedded section 7, as shown in FIG. 3B. Also, each second contact inclination surface 10b is provided to be positioned on the lower side of the outer peripheral surface of the corresponding exposed section 6 and inclined at an angle of, for example, substantially 10 degrees with respect to a boundary surface 9 between the exposed section 6 and the corresponding embedded section 7. Note that the first contact inclination surface 10a and the second contact inclination surface 10b are not necessarily required to be constituted by separate inclined surfaces and may be constituted by a continuous curved surface.

Also, the second inclined sections 11 of each embedded section 7 are inclinations formed so that the outer peripheral portion of the corresponding primary molded article 2 is easily and laterally expanded and deformed when it is vertically pressed, and are surfaces inclined at an angle of, for example, substantially −5 degrees with respect to the boundary surface 9 between the corresponding exposed section 6 and the embedded section 7, as shown in FIG. 3B. Note that the second inclined sections 11 are not necessarily required to be inclined surfaces and may be curved surfaces.

Next, a manufacturing method of the hands 1 is described with reference to FIG. 4 to FIG. 10.

In manufacturing the bands 1, the primary molded articles 2 are molded in advance by molding dies (not shown). As described above, each primary molded article 2 has a belt shape and is made of a soft synthetic resin such as urethane resin, silicone resin, or an elastomer. On one end of each primary molded article 2 in the longitudinal direction, the band attachment section 4 is provided. Also, on the upper surface of the exposed section 6 of each primary molded article 2, the decorative layer 8 is provided.

The molding die 15 includes an upper die 16 serving as a first die and a lower die 17 serving as a second die, and is structured such that, when these dies are vertically stacked, molding spaces (cavities) 18 are formed inside these dies, as shown in FIG. 4. Also, this molding die 15 has a parting line (mold release line) PL provided on a portion where the upper die 16 and the lower die 17 are stacked. This parting line PL is provided on substantially the same plane as the undersurface of each primary molded article 2, that is, the undersurface of the embedded section 7 of each primary molded article 2.

In this embodiment, in the inner surface of the upper die 16, attachment recessed sections 20 are provided each of which has a groove shape and in each of which the exposed section 6 of the corresponding primary molded article 2 is arranged and attached, as shown in FIG. 4 to FIG. 7. Each attachment recessed section 20 is formed such that its length in the longitudinal direction is equal to the length of the corresponding primary molded article 2 in the longitudinal direction and its length in the width direction orthogonal to the longitudinal direction is slightly longer than the length of the primary molded article 2 in the width direction. That is, each attachment recessed section 20 is structured such that when the exposed section 6 of the corresponding primary molded article 2 is arranged in the attachment recessed section 20, a space S is formed between the inner peripheral surface of the attachment recessed section 20 formed along the longitudinal direction and the outer peripheral surface of the exposed section 6 formed along the longitudinal direction so as to correspond to the inner peripheral surface.

Further, on the inner peripheral surface of each attachment recessed section 20, die inclination sections 21 are provided which correspond to the first inclined sections 10 of the exposed section 6 of the corresponding primary molded article 2, as shown in FIG. 4. Each die inclination section 21 includes a reception inclination surface 21a that corresponds to the first contact inclination surface 10a of the corresponding first inclined section 10 of the exposed section 6 of the primary molded article 2 and serves to receive the deformation of the outer peripheral portion of the primary molded article 2, and a molding inclination surface 21b with which the corresponding second contact inclination surface 10b of the exposed section 6 of the primary molded article 2 comes in close contact when the outer peripheral portion of the primary molded article 2 is pressed with the second contact inclination surface 10b of the first inclined section 10 of the exposed section 6 of the primary molded article 2 opposing the inner peripheral surface of the attachment recessed section 20 of the upper die 16 and the space S being formed therebetween.

Also, there is a small space (not shown) between each reception inclination surface 21a and the corresponding first contact inclination surface 10a, and the first contact inclination surface 10a comes in close contact with the reception inclination surface 21a when the outer peripheral portion of the primary molded article 2 is pressed. The reception inclination surface 21a of each die inclination section 21 is located on the upper side of the inner peripheral surface of the attachment recessed section 20 and inclined at an angle of, for example, substantially 45 degrees with respect to the parting line PL of the molding die 15, as shown in FIG. 4. Each molding inclination surface 21b is located on the lower side of the inner peripheral surface of the attachment recessed section 20 and inclined at an angle of, for example, substantially 10 degrees with respect to the parting line PL of the molding die 15.

Then, in a first step shown in FIG. 4, each primary molded article 2 made of a soft material is arranged in the molding die 15. Note that, in FIG. 4 to FIG. 9, only one side of the molding die 15 which is used for molding one of the bands 1 is shown for simplification of description. Here, the molding die 15 is opened by the upper die 16 and the lower die 17 being released from each other, and the exposed section 6 of the primary molded article 2 is arranged in the attachment recessed section 20 of the upper die 16. Then, the primary molded article 2 is attached into the attachment recessed section 20 with the embedded section 7 of the primary molded article 2 projecting from the attachment recessed section 20.

Here, the upper surface of the exposed section 6 of the primary molded article 2 is brought into close contact with the upper inner surface of the attachment recessed section 20 of the upper die 16 and the first contact inclination surface 10a of each first inclined section 10 of the exposed section 6 is brought into close contact with the reception inclination surface 21a of the corresponding die inclination section 21 on the inner peripheral surface of the attachment recessed section 20 of the upper die 16, so that the second contact inclination surface 10b of each first inclined section 10 of the exposed section 6 is opposed to the molding inclination surface 21b of the corresponding die inclination section 21 on the inner peripheral surface of the attachment recessed section 20 of the upper die 16 with the space S being formed therebetween, as shown in FIG. 4.

When the upper die 16 and the lower die 17 are stacked in this state, the molding spaces 18 are formed inside these dies, and the primary molded article 2 is arranged in the molding die 15 with the embedded section 7 of the primary molded article 2 projecting into the molding spaces 18.

Figure 5:
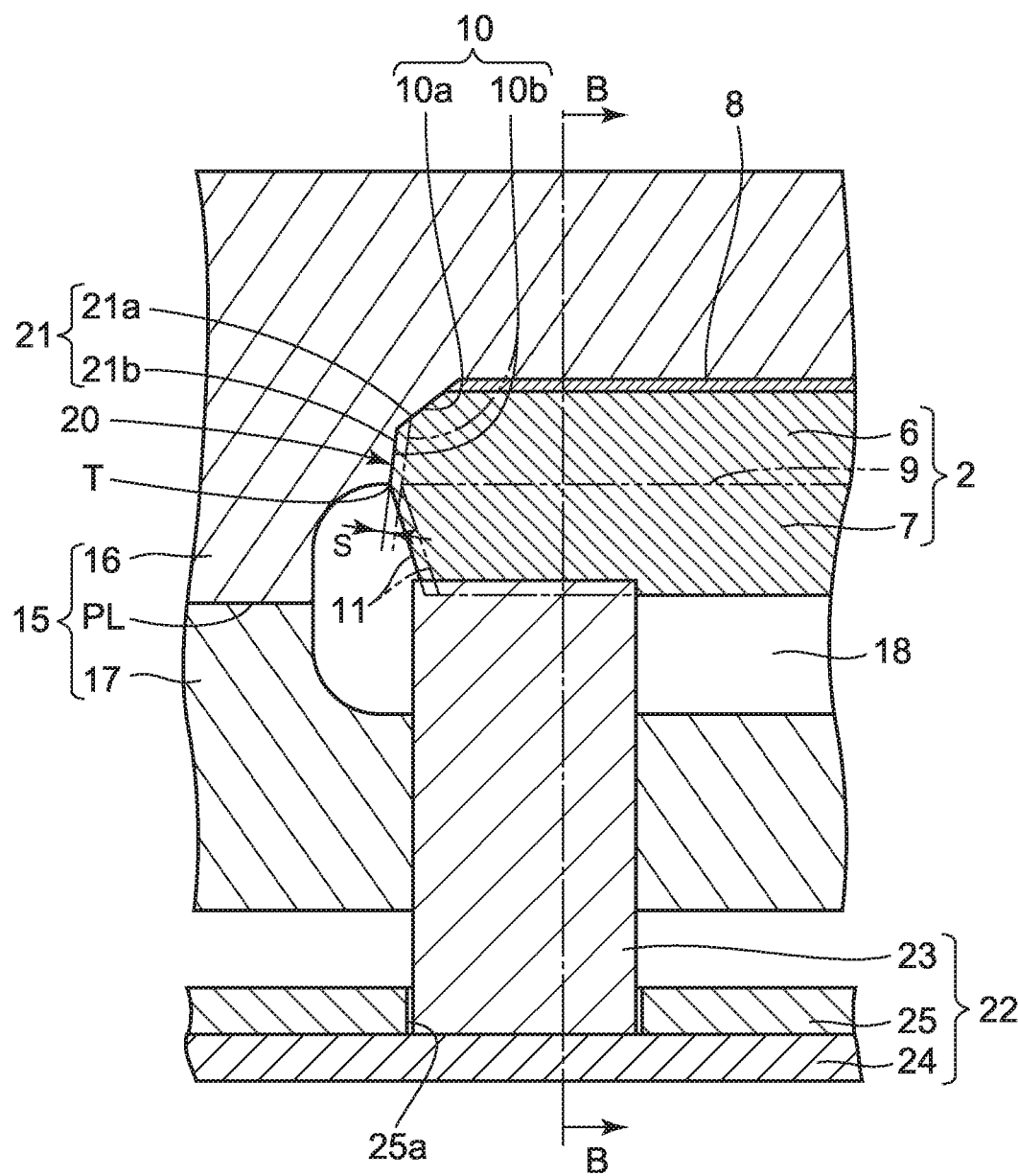
FIG. 5 is an enlarged sectional view of the main portion, which shows a state where an outer peripheral portion of the primary molded article arranged in the molding die shown in FIG. 4 has been pressed by a pressing section.

Then, in a second step shown in FIG. 5, the outer peripheral portion of the primary molded article 2 arranged in the molding die 15 is pressed and deformed by a pressing section 22, so that the outer peripheral portion of the exposed section 6 of the primary molded article 2 is brought into close contact with the inner peripheral surface of the attachment recessed section 20 of the upper die 16 of the molding die 15. When the outer peripheral portion of the primary molded article 2 is pressed by the pressing section 22, the outer peripheral portion of the primary molded article 2 expands laterally, so that the outer peripheral surface of the exposed section 6 of the primary molded article 2 is pressed against the inner peripheral surface of the attachment recessed section 20 of the upper die 16.

In this embodiment, the pressing section 22 includes a pair of pressing cores 23 that press the primary molded article 2, a slide plate 24 that causes the pair of pressing cores 23 to slide in the vertical direction, and a base plate 25 provided under the lower die 17 so as to slidably hold the pair of pressing cores 23, as shown in FIG. 5 to FIG. 8. The pair of pressing cores 23 are structured to be arranged on the undersurface of the primary molded article 2 along its longitudinal direction and to press, from below, both side portions of the undersurface of the embedded section 7 of the primary molded article 2 in the width direction.

That is, these pressing cores 23 have plate shapes that are long along the longitudinal direction of the primary molded article 2, and their lengths in the longitudinal direction are slightly shorter than the length of the primary molded article 2 in the longitudinal direction, as shown in FIG. 5 to FIG. 8. Also, their lengths in the vertical direction are substantially equal to a length extending from the undersurface of the embedded section 7 of the primary molded article 2 to the bottom surface of the base plate 25 through a guide hole 25a in the base plate 25.

As a result of this structure, when pressed upward by the slide plate 24, the pair of pressing cores 23 presses both side portions of the undersurface of the embedded section 7 of the primary molded article 2 by being pushed into the molding spaces 18 in the molding die 15, as shown in FIG. 5 to FIG. 8. Also, the pair of pressing cores 23 are structured such that, when they are arranged inside the lower die 17 by being pressed downward by the slide plate 24, the upper surfaces of the pressing cores 23 become flush with the inner bottom surfaces of the molding spaces 18.

Furthermore, the pressing section 22 is structured such that the pair of pressing cores 23 are attached to the upper surface of the slide plate 24 through a pair of guide holes 25a in the base plate 25 and, by the slide plate 24 being vertically slid in this state, the respective upper portions of the pair of pressing cores 23 appear inside the molding spaces 18, as shown in FIG. 5 to FIG. 8.

As a result, in the pressing section 22, by being pushed into the molding spaces 18 from the lower die 17 side by the slide plate 24, the respective upper portions of the pair of pressing cores 23 press, toward the inner upper surface of the upper mold 16, both side portions on outer peripheral sides on the undersurface of the embedded section 7 of the primary molded article 2 arranged projecting into the molding spaces 18, and thereby presses and deforms the outer peripheral portion of the primary molded article 2 so as to press the outer peripheral surface of the exposed section 6 of the primary molded article 2 against the inner peripheral surface of the attachment recessed section 20 of the upper die 16, as shown in FIG. 5 to FIG. 8.

Here, the outer peripheral portion of the primary molded article 2 has the shape by which it is easily and laterally expanded and deformed when it is vertically pressed. Also, the outer peripheral surface of the exposed section 6 of the primary molded article 2 is provided with the first inclined sections 10, and the outer peripheral surface of the embedded section 7 of the primary molded article 2 is provided with the second inclined sections 11 which are opposite in inclination to the first inclined sections 10 of the exposed section 6.

Accordingly, when the outer peripheral portion of the primary molded article 2 is to be pressed and deformed by the pair of pressing cores 23 of the pressing section 22, the upper surface of the exposed section 6 of the primary molded article 2 is in close contact with the upper inner surface of the attachment recessed section 20 of the upper die 16 in advance and the first contact inclination surfaces 10a of the first inclined sections 10 of the exposed section 6 are in close contact with the reception inclination surfaces 21a of the die inclination sections 21 on the inner peripheral surface of the attachment recessed section 20 of the upper die 16 in advance.

In addition, at that point, the second contact inclination surfaces 10b of the first inclined sections 10 of the exposed section 6 are opposing the molding inclination surfaces 21b of the die inclination sections 21 on the inner peripheral surface of the attachment recessed section 20 of the upper die 16 with the space S formed therebetween. Accordingly, when pressed and deformed by the pair of pressing cores 23 of the pressing section 22, the outer peripheral portion of the primary molded article 2 is expanded laterally, and the outer peripheral surface of the exposed section 6 of the primary molded article 2 is pressed against the inner peripheral surface of the attachment recessed section 20 of the upper die 16.

Accordingly, when the outer peripheral portion of the primary molded article 2 is expanded laterally by being pressed and deformed by the upper portions of the pair of pressing cores 23 of the pressing section 22, the outer peripheral portion of the exposed section 6 is expanded laterally with the first contact inclination surfaces 10a of the first inclined sections 10 of the exposed section 6 of the primary molded article 2 being pressed against the reception inclination surfaces 21a of the die inclination sections 21 on the inner peripheral surface of the attachment recessed section 20 of the upper die 16. Therefore, the second contact inclination surfaces 10b of the first inclined sections 10 of the exposed section 6 are pressed against and brought into close contact with the molding inclination surfaces 21b of the die inclination sections 21 on the inner peripheral surface of the attachment recessed section 20 of the upper die 16.

Figure 9:
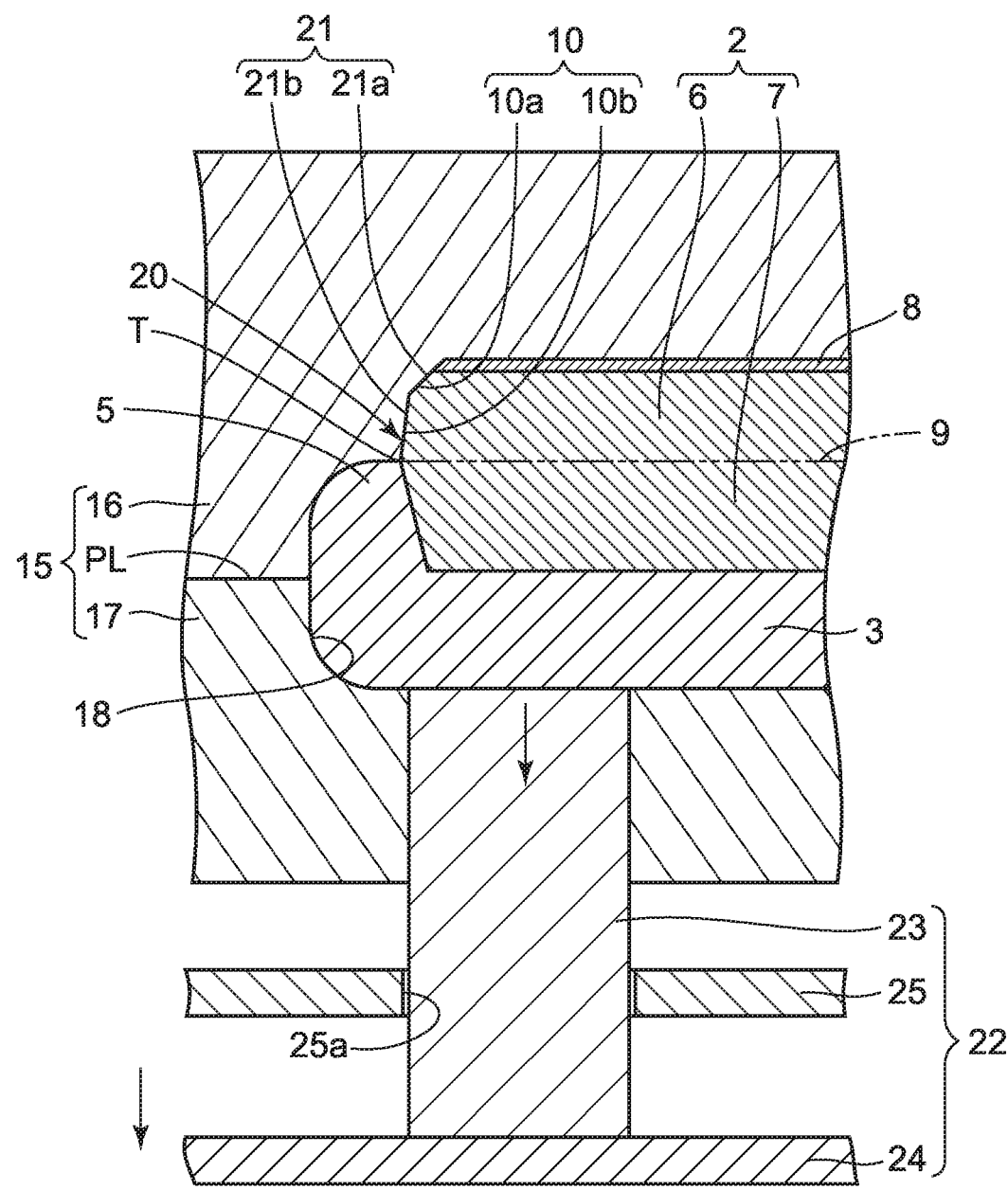
FIG. 9 is an enlarged sectional view of the main portion, which shows a state where a secondary molded article is molded by the pressing cores of the pressing section being withdrawn from inside the molding die while resin for a secondary molded article is being injected into the molding die shown in FIG. 5.

Then, in a third step shown in FIG. 9, resin to be the secondary molded article 3 is injected into the molding spaces 18 in the molding die 18, and the secondary molded article 3 is molded by the pair of pressing cores 23 of the pressing section 22 being withdrawn from inside the molding spaces 18 during the injection of the resin. In the present embodiment, the resin to be the secondary molded article 3 is the same as that of the primary molded article 2 except its color.

Figure 6:
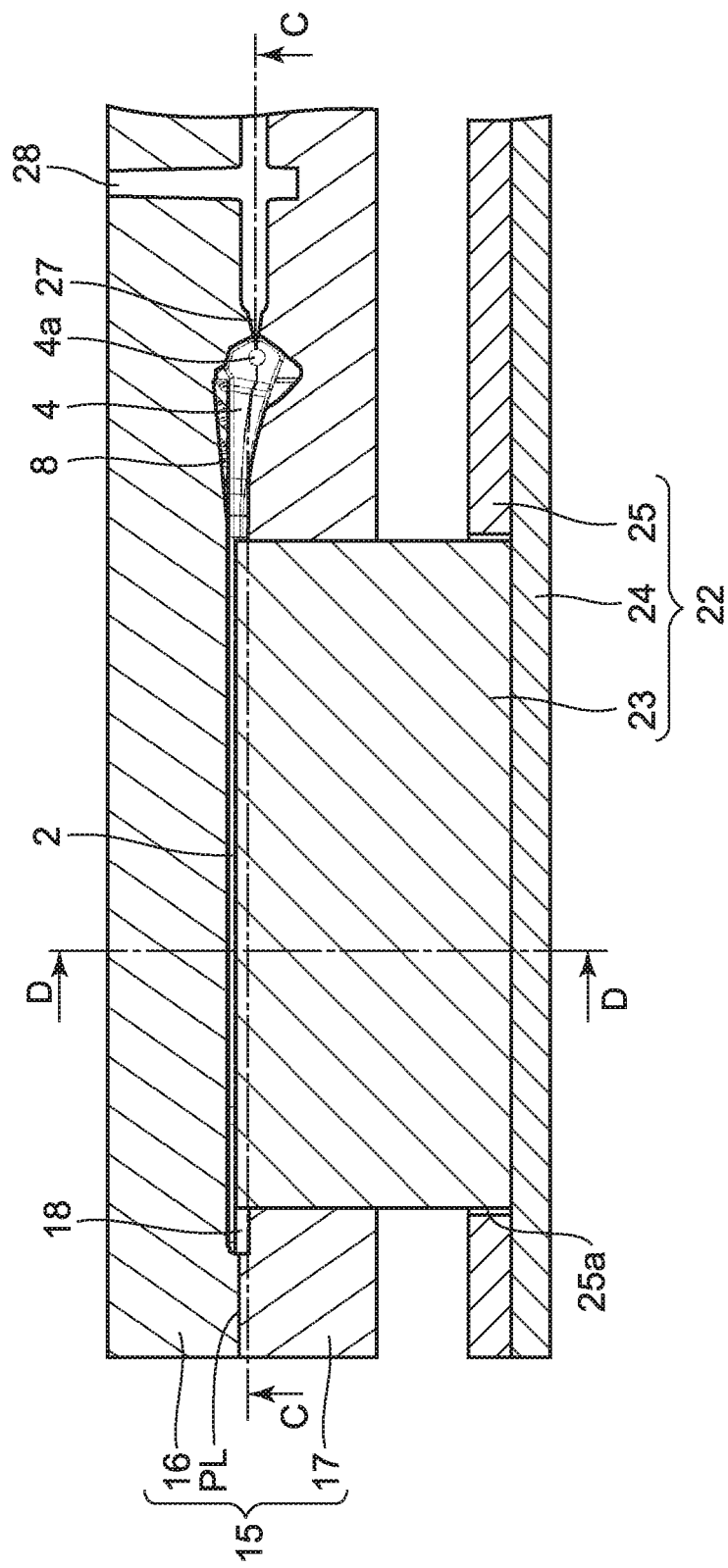
FIG. 6 is a cross-sectional view showing the main portion taken along line B-B in FIG. 5.
Figure 7:
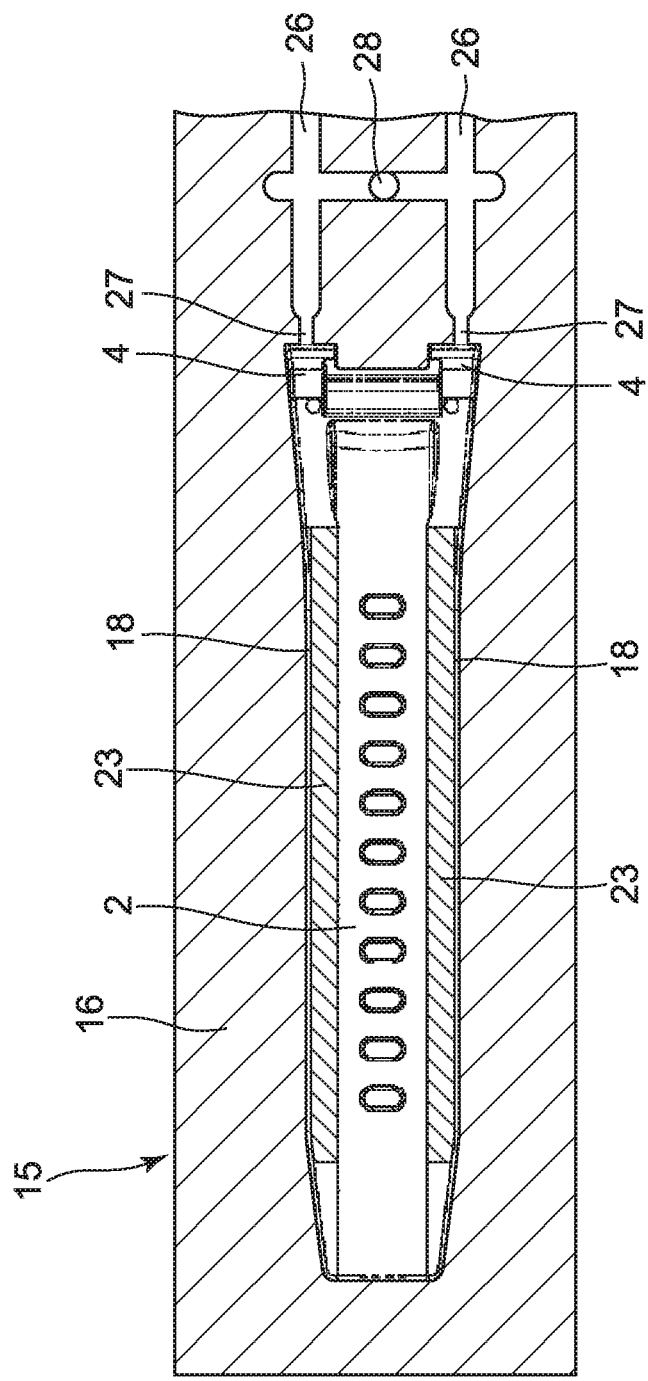
FIG. 7 is a cross-sectional view showing the main portion taken along line C-C in FIG. 6.
Figure 8:
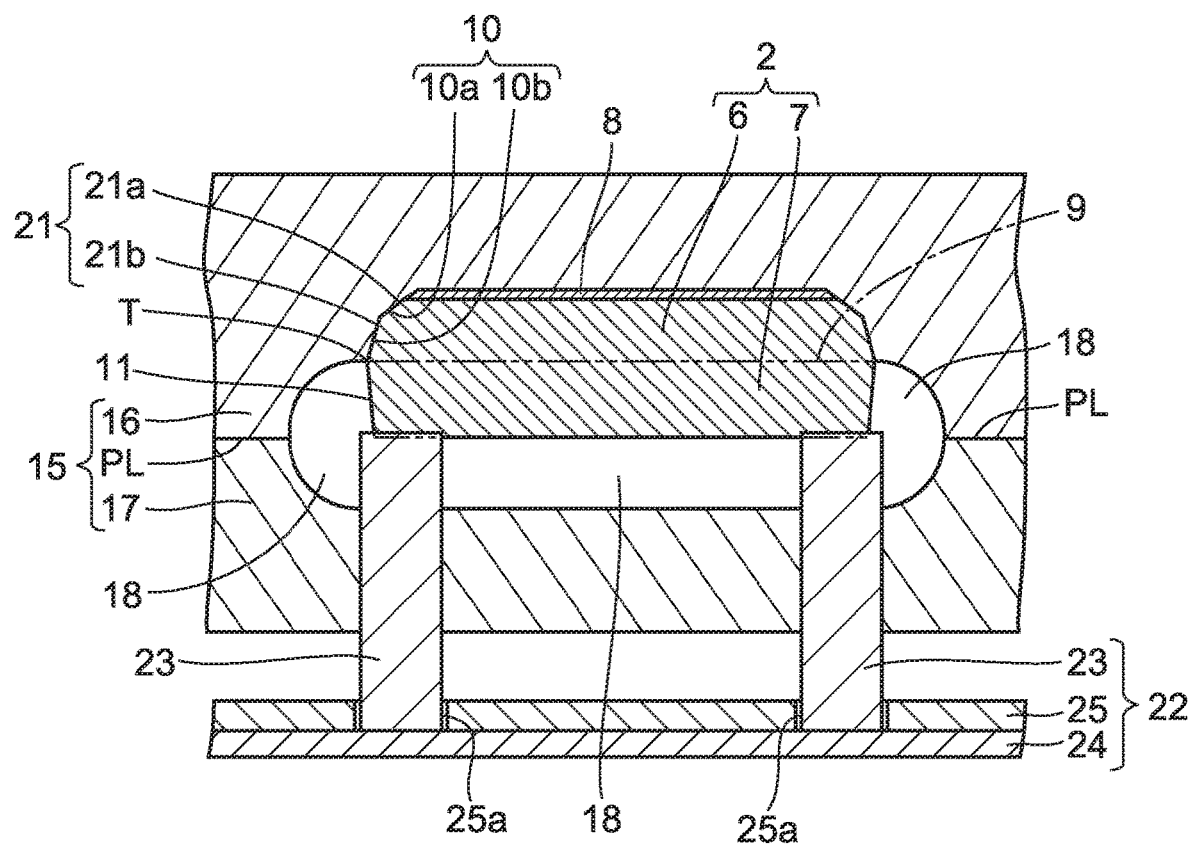
FIG. 8 is an enlarged sectional view showing the main portion taken along line D-D in FIG. 6.

Inside the molding die 15, the molding spaces 18 corresponding to each of the bands 1 that are attached to the 12 o'clock and 6 o'clock sides (one of which is not shown) of the wristwatch case (not shown) are provided, as shown in FIG. 6 and FIG. 7. Accordingly, inside the molding die 15, a plurality of runner sections 26 for casting the resin for the secondary molded article 3 into the molding spaces 18 are provided. Ends of these runner sections 26 are connected to gates 27 in the molding die 15, their intermediate portions are connected to each other, and a resin inlet 28 is provided at this junction portion.

As a result of this structure, the rein to be the secondary molded article 3 is fed into the junction between the runner sections 26 through the resin inlet 28, guided toward the gates 27 by the plurality of runner sections 26 connected to this junction, and injected into the molding space 18. Then, when the resin injected into the molding spaces 18 in the molding die 15 reaches areas around the undersurface and the outer peripheral surface of the embedded section 7 of the primary molded article 2 arranged in the molding spaces 18, the pair of pressing cores 23 of the pressing section 22 is withdrawn from inside the molding spaces 18.

That is, when the resin injected into the molding spaces 18 in the molding die 15 reaches the areas around the undersurface of the embedded section 7 of the primary molded article 2 in the molding space 18 through the space between the pair of pressing cores 23, the exposed section 6 of the primary molded article 2 is pressed against the inside of the attachment recessed section 20 of the upper die 16 by the injected resin, and the injected resin comes in pressure contact with the undersurface and deformed outer peripheral portion of the embedded section 7 of the primary molded article 2.

In this state, the outer peripheral portion of the primary molded article 2 is maintained in the pressed and deformed state even when the pair of pressing cores 23 of the pressing section 22 is withdrawn from inside the molding space 18. Accordingly, by the resin for the secondary molded article 3 being further injected to fill, the molding spaces 18 in the molding die 15 with the pair of pressing cores 23 of the pressing section 22 being withdrawn from inside the molding space 18, the secondary molded article 3 is molded with the embedded section 7 of the primary molded article 2 being embedded therein. Then, the upper die 16 and the lower die 17 are released from each other, and the molded article is taken out from inside of these dies. As a result of the above-described steps, each band 1 is acquired.

Figure 10:
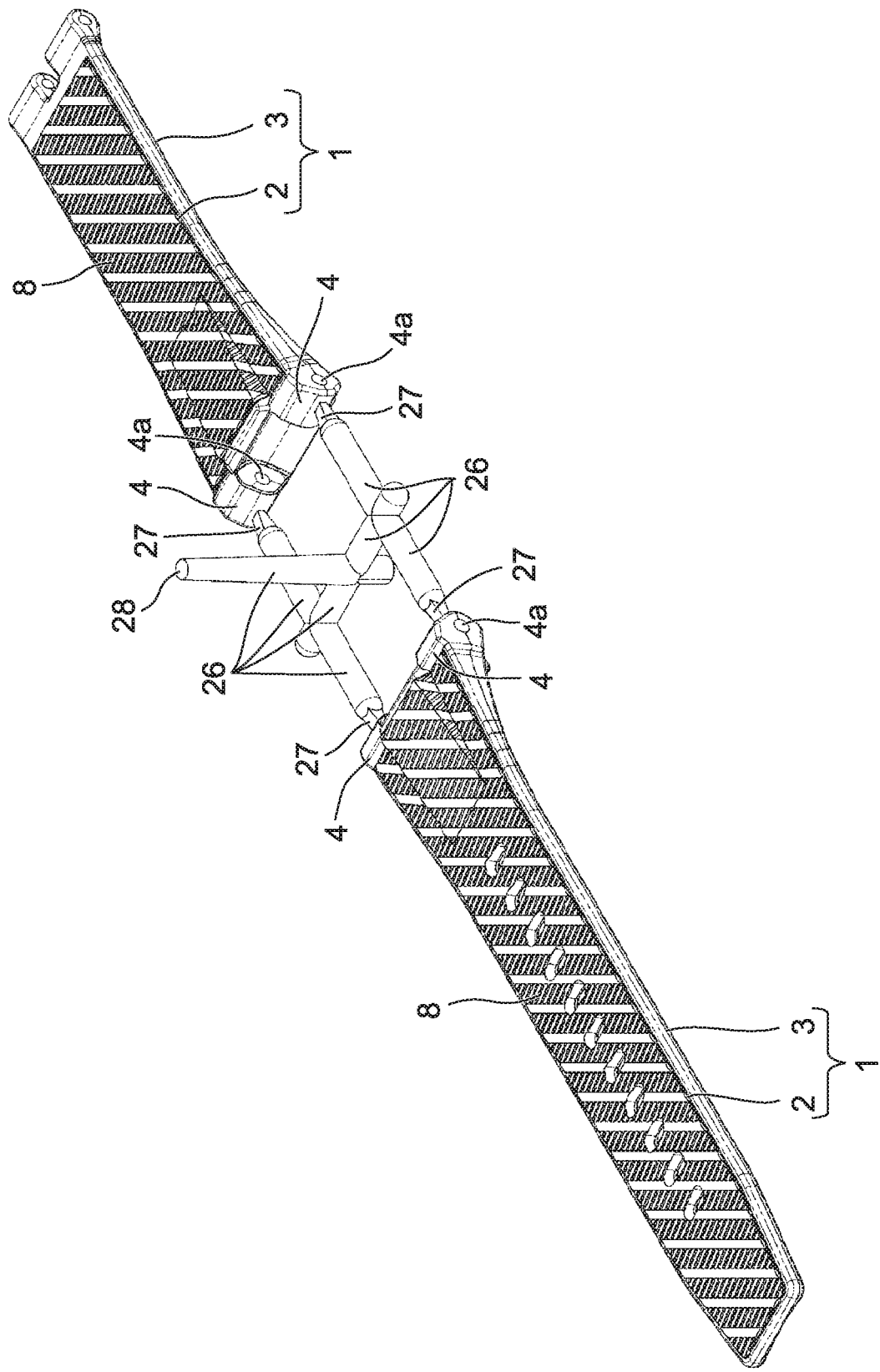
FIG. 10 is a perspective view showing a band that is an article molded in the molding die shown in FIG. 9.

At this point, the band 1 that is attached to the 12 o'clock side of the wristwatch case (not shown) and the band 1 that is attached to the 6 o'clock side are connected to each other by the plurality of runner sections 26 provided between these bands 1, as shown in FIG. 10. Accordingly, the plurality of runner sections 26 are cut off at the gates 27 so that the band 1 on the 12 o'clock side of the wristwatch case (not illustrated) and the band 1 on the 6 o'clock side are separated from each other. As a result, the bands 1 shown in FIG. 1 are acquired.

As described above, the manufacturing method of each band 1 includes the first step of arranging the primary molded article 2 made of a soft material in the molding die 15 while securing the space S between the outer peripheral surface of the exposed section 6 which is exposed to the outside without being embedded in the secondary molded article 3 and the inner peripheral surface of the molding die 15 which corresponds to the outer peripheral surface; the second step of pressing and deforming the outer peripheral portion of the primary molded article 2 arranged in the molding die 15 by the pair of pressing cores 23 of the pressing section 22 so as to bring the outer peripheral surface of the exposed section 6 into close contact with the inner peripheral surface of the molding die 15 which corresponds to the space 5; and the third step of molding the secondary molded article 3 by withdrawing the pair of pressing cores 23 of the pressing section 22 from inside the molding die 15 while injecting resin to be the secondary molded article 3 into the molding die 15, whereby the band 1 with a good appearance and design can be favorably manufactured.

That is, in the manufacturing method of each band 1, in the first step, the primary molded article 2 made of a soft material is arranged in the molding die 15 such that the space S is secured between the outer peripheral surface of the exposed section 6 of the primary molded article 2 and the inner peripheral surface of the molding die 15 which corresponds to the outer peripheral surface, whereby the primary molded article 2 is unfailingly and favorably arranged in the molding die 15 without the primary molded article 2 not fitting into the molding die 15. In addition, in the second step, the outer peripheral portion of the primary molded article 2 arranged in the molding die 15 is pressed and deformed by the pair of pressing cores 23 of the pressing section 22, so that the outer peripheral surface of the exposed section 6 can be brought into close contact with the inner peripheral surface of the molding die 15.

In this manufacturing method, in the third step, the secondary molded article 3 is molded by the pair of pressing cores 23 of the pressing section 22 being withdrawn from inside the molding die 15 while the resin to be the secondary molded article 3 is being injected into the molding die 15, whereby the primary molded article 2 and the secondary molded article 3 can be integrally formed without grooves being provided in the boundary portions T between the primary molded article 2 and the secondary molded article 3, and the band 1 with a good appearance and design can be favorably manufactured.

That is, in the manufacturing method of each band 1, the outer peripheral, portion of the primary molded article 2 arranged in the molding die 15 is pressed and deformed by the pair of pressing cores 23 of the pressing section 22 so as to bring the outer peripheral surface of the exposed section 6 into close contact with the inner peripheral surface of the molding die 15 and, in this state, the secondary molded article 3 is molded by the pair of pressing cores 23 of the pressing section 22 being withdrawn while the resin to be the secondary molded article 3 is being injected into the molding die 15. Accordingly, the upper surface portions of the shoulder sections 5 of the secondary molded article 3 on the exposed section 6 side can coincide with the boundary portions T between the outer peripheral surface of the exposed section 6 and the outer peripheral surface of the embedded section 7 in the primary molded article 2. As a result, no groove or the like is present in the boundary portions T between the primary molded article 2 and the secondary molded article 3, whereby the band 1 with a good appearance and design can be favorably manufactured.

Also, in the manufacturing method of each hand 1, the outer peripheral portion of the primary molded article 2 has a shape by which, when it is pressed by the pair of pressing cores 23 of the pressing section 22, the outer peripheral surface of the exposed section 6 is deformed to come in close contact with the inner peripheral surface of the molding die 15. Accordingly, although the space S is secured between the outer peripheral surface of the exposed section 6 of the primary molded article 2 and the inner peripheral surface of the molding die 15 corresponding to the outer peripheral surface when the primary molded article 2 is arranged in the molding die 15, the outer peripheral portion of the primary molded article 2 can be unfailingly deformed when the outer peripheral portion of the primary molded article 2 arranged in the molding die 15 is pressed and deformed by the pair of pressing cores 23 of the pressing section 22, whereby the outer peripheral surface of the exposed section 6 of the primary molded article 2 can be favorably brought into close contact with the inner peripheral surface of the molding die 15.

That is, the primary molded article 2 includes the exposed section 6 which is exposed to the outside of the secondary molded article 3 and the embedded section 7 which is embedded in the secondary molded article 3. The outer peripheral surface of the exposed section 6 is provided with the first inclined sections 10 which correspond to the inner peripheral surface of the molding die 15. The outer peripheral surface of the embedded section 7 is provided with the second inclined sections 11 which, when the outer peripheral portion of the primary molded article 2 is pressed by the pair of pressing cores 23 of the pressing section 22, cause the outer peripheral portion to expand laterally. The second inclined sections 11 are opposite in orientation to the first inclined sections 10. Accordingly, by the second inclined sections 11 which are opposite in orientation to the first inclined sections 10, the first inclined sections 10 of the outer peripheral surface of the exposed section 6 can be favorably deformed and unfailingly brought into close contact with the inner peripheral surface of the molding die 15.

That is, in the manufacturing method of each band 1, when the outer peripheral portion of the primary molded article 2 arranged in the molding die 15 is pressed and deformed by the pair of pressing cores 23 of the pressing section 22 with the first inclined sections 10 of the outer peripheral surface of the exposed section 6 corresponding to the inner peripheral surface of the molding die 15, the outer peripheral portion of the exposed section 6 is unfailingly expanded laterally by the second inclined sections 11 provided on the outer peripheral surface of the embedded section 7 which are opposite in orientation to the first inclined sections 10, whereby the outer peripheral portion of the exposed section 5 is favorably deformed so as to unfailingly bring the first inclined sections 10 of the outer peripheral surface of the exposed section 6 into close contact with the inner peripheral surface of the molding die 15.

Also, in the manufacturing method of each band 1, when the primary molded article 2 and the secondary molded article 3 integrally formed in the molding die 15 are to be taken out from inside the molding die 15 by the molding die 15 being separated therefrom, the primary molded article 2 formed integrally with the secondary molded article 3 can be easily and favorably taken out from inside the molding die 15 by the first inclined sections 10 of the exposed section 6.

Moreover, each first inclined section 10 of the exposed section 6 includes the first contact inclination surface 10a which is a part of the outer peripheral surface, that is, the upper side of the outer peripheral surface of the exposed section 6 and corresponds to and comes in close contact with a part of the inner peripheral surface, that is, the upper side of the inner peripheral surface of the molding die 15 when the primary molded article 2 is arranged in the molding die 15, and the second contact inclination surface 10b which secures the space S between the outer peripheral surface of the exposed section 6 and the inner peripheral surface of the molding die 15 when the primary molded article 2 is arranged in the molding die 15. As a result, the first contact inclination surfaces 10a of the exposed section 6 can be unfailingly brought into close contact with the inner peripheral surface of the molding die 15 when the primary molded article 2 is arranged in the molding die 15 and, in this state, the second contact inclination surfaces 10*b* of the exposed section 6 can be unfailingly opposed to the inner peripheral surface of the molding die 15 with the space S therebetween.

Furthermore, in the manufacturing method of each band 1, the molding die 15 includes the upper die 16 serving as a first die and the lower die 17 serving as a second die, the inner surface of the upper die 16 is provided with the attachment recessed sections 20 in each of which the exposed section 6 of the corresponding primary molded article 2 is arranged with the space S, and the embedded section 7 of the primary molded article 2 is arranged projecting into an internal molding space 18 surrounded by the upper die 16 and the lower die 17, whereby the primary molded article 2 is unfailingly and favorably arranged in the molding die 15.

That is in the manufacturing method of each band 1, the exposed section 6 of the primary molded article 2 can be unfailingly and favorably arranged in the attachment recessed section 20 provided in the inner surface of the upper die 16 with the space S therebetween, and the embedded section 7 of the primary molded article 2 can be unfailingly and favorably arranged projecting from the attachment recessed section 20 into the molding spaces 18 in the molding die 15.

In addition, the inner peripheral surface of the attachment recessed section 20 of the upper die 16 that is a first die is provided with the die inclination sections 21 corresponding to the first inclined sections 10 of the exposed section 6 of the primary molded article 2 and, when the exposed section 6 of the primary molded article 2 is to be arranged in the attachment recessed section 20 of the upper die 16, the first inclined sections 10 of the exposed section 6 can be unfailingly and favorably positioned corresponding to the die inclination sections 21 of the inner peripheral surface of the attachment recessed section 20 with the space S being secured between each first inclined section 10 of the exposed section 6 of the primary molded article 2 and each die inclination section 21 of the inner peripheral surface of the attachment recessed section 20.

That is, each die inclination section 21 of the attachment recessed section 20 includes the reception inclination surface 21*a* provided corresponding to the related first contact inclination surface 10*a* of the exposed section 6 of the primary molded article 2 so as to receive the deformation of the outer peripheral portion of the primary molded article 2, and the molding inclination surface 21*b* to which the related second contact inclination surface 10*b* of the exposed section 6 of the primary molded article 2 corresponds with the space S and with which the second contact inclination surface 10*b* comes in close contact when the outer peripheral portion of the primary molded article 2 is pressed and deformed, whereby the exposed section 6 of the primary molded article 2 can be unfailingly and favorably arranged in the attachment recessed section 20 of the upper die 16.

Moreover, when the exposed section 6 of the primary molded article 2 is arranged in the attachment recessed section 20 of the upper die 16, each first contact inclination surface 10*a* of the exposed section 6 of the primary molded article 2 corresponds to and comes in close contact with the corresponding reception inclination surface 21*a* of the attachment recessed section 20 of the upper die 16, so that each first contact inclination surface 10*a* of the exposed section 6 can be unfailingly and favorably received by the corresponding reception inclination surface 21*a* of the attachment recessed section 20 of the upper die 16 when the outer peripheral portion of the primary molded article 2 is pressed and deformed.

Furthermore, when the exposed section 6 of the primary molded article 2 is arranged in the attachment recessed section 20 of the upper die 16, the second contact inclination surfaces 10*b* of the exposed section 6 of the primary molded article 2 correspond to the molding inclination surfaces 21*b* with the space S therebetween. Therefore, the outer peripheral portion of the primary molded article 2 can expand laterally when it is pressed and deformed. As a result, the second contact inclination surfaces 10*b* of the exposed section 6 can be unfailingly and favorably brought into close contact with the molding inclination surfaces 21*b* of the attachment recessed section 20 by being pushed into the space S.

Also, in the manufacturing method of each band 1, the pair of pressing cores 23 of the pressing section 22 presses the embedded section 7 of the primary molded article 2 in the molding spaces 18 toward the upper die 16 that is a first die by being pushed into the molding space 18 from the lower die 17 that is a second die, and presses the outer peripheral surface of the exposed section 6 of the primary molded article 2 against the inner peripheral surface of the attachment recessed section 20 of the upper die 16, whereby the outer peripheral portion of the primary molded article 2 is unfailingly and favorably pressed and deformed.

That is, the pressing section 22 includes the pair of pressing cores 23 which presses the primary molded article 2, the slide plate 24 which causes the pair of pressing cores 23 to slide in the vertical direction, and the base plate 25 provided under the lower die 17 so as to slidably hold the pair of pressing cores 23. When the slide plate 24 is slid upward, the pair of pressing cores 23 presses both side portions on the undersurface of the embedded section 7 of the primary molded article 2 toward the upper die 16 that is a first die. As a result of this structure, by the pair of pressing cores 23, the outer peripheral portion of the primary molded article 2 can be unfailingly and favorably pressed and deformed.

In addition, when resin to be the secondary molded article 3 is injected into the molding die 15, this injected resin flows into the space between the pair of pressing cores 23 even in the state where the pair of pressing cores 23 is pressing both side portions on the undersurface of the embedded section 7 of the primary molded article 2. By this resin flowed thereinto, the embedded section 7 of the primary molded article 2 is pressed toward the upper die 16 that is a first die, so that the primary molded article 2 is pressed against the inside of the upper die 16.

Also, in the manufacturing method of each band 1, when the resin injected into the molding die 15 so as to be the secondary molded article 3 reaches the area around the undersurface and the outer peripheral portion of the embedded section 7 of the primary molded article 2 in the molding die 15 in the third step, the pair of pressing cores 23 of the pressing section 22 is withdrawn from inside the molding die 15, whereby the secondary molded article 3 having the embedded section 7 of the primary molded article 2 embedded therein can be favorably molded.

That is, in the manufacturing method of each band 1, when the resin injected into the molding space 18 in the molding die 15 reaches the area around the undersurface and the outer peripheral portion of the embedded section 7 of the primary molded article 2, the exposed section 6 of the primary molded article 2 is pressed against the inside of the attachment recessed section 20 of the upper die 16 by the injected resin, and the injected resin is brought into pressure contact with the undersurface and deformed outer peripheral portion of the embedded section 7 of the primary molded article 2, whereby the outer peripheral portion of the primary molded article 2 can be kept in the pressed and deformed state.

As a result of this structure, in the manufacturing method of each band 1, the outer peripheral portion of the primary molded article 2 is kept in the pressed and deformed state even when the pair of pressing cores 23 of the pressing section 22 is withdrawn from inside the molding space 18 during the injection of the resin into the molding space 18 in the molding die 15. Accordingly, in the state where the pair of pressing cores 23 of the pressing section 22 has been withdrawn from inside the molding space 18, the resin for the secondary molded article 3 can be further injected to fill the molding space 18 in the molding die 15, whereby the secondary molded article 3 having the embedded section 7 of the primary molded article 2 embedded therein can be accurately and favorably molded.

Thus, each band 1 includes the primary molded article 2 which is made of a soft material and includes the exposed section 6 and the embedded section 7 and the secondary molded article 3 in which the embedded section 7 of the primary molded article 2 is embedded with the exposed section 6 being exposed and which includes the shoulder sections 5 that laterally project outside the outer periphery of the primary molded article 2. In this band 1, the upper surfaces of the shoulder sections 5 of the secondary molded article 3 opposing the exposed section 6 coincide with the boundary portions T between the outer peripheral surface of the exposed section 6 and the outer peripheral surface of the embedded section 7 in the primary molded article 2. As a result, the band 1 has a good appearance and design.

That is, each band 1 is structured such that, even though the primary molded article 2 and the secondary molded article 3 are integrally formed with the embedded section 7 of the primary molded article 2 being embedded in the secondary molded article 3, the upper surfaces of the shoulder sections 5 of the secondary molded article 3 opposing the exposed section 6 coincide with the boundary portions T between the outer peripheral surface of the exposed section 6 and the outer peripheral surface of the embedded section 7 in the primary molded article 2, whereby the primary molded article 2 and the secondary molded article 3 can be integrally formed without grooves or the like being formed in the boundary portions T between the primary molded article 2 and the secondary molded article 3. As a result, a band with a good appearance and design can be provided.

Also, each band 1 is structured such that the embedded section 7 is embedded in the secondary molded article 3 with the outer peripheral portion of the primary molded article 2 being pressed and deformed, whereby the boundary portions T between the outer peripheral surface of the exposed section 6 and the outer peripheral surface of the embedded section 7 in the primary molded article 2 and the upper surface portions of the shoulder sections 5 of the secondary molded article 3 on the exposed section 6 side unfailingly and favorably coincide with each other. As a result, the primary molded article 2 and the secondary molded article 3 can be integrally formed without grooves or the like being formed in the boundary portions T between the primary molded article 2 and the secondary molded article 3.

Moreover, in each band 1, the primary molded article 2 and the secondary molded article 3 have different colors, which further enhance the appearance quality and the design quality. Furthermore, in each band 1, the color combination of the primary molded article 2 and the secondary molded article 3 can be changed, which provides a wide range of variations in design and makes it possible to provide a band with a better appearance and design.

Still further, each band 1 has the decorative layer 8 provided on the upper surface that is the surface of the exposed section 6 of the primary molded article 2, which also enhances the appearance quality and the design quality.

Note that, although the primary molded article 2 and the secondary molded article 3 are made of the same soft material in the above-described embodiment, the present invention is not limited thereto. The primary molded article 2 and the secondary molded article 3 may be made of different materials, i.e., different soft or hard materials.

Also, although the present invention has been applied to the bands 1 of a wristwatch in the above-described embodiment, the present invention is not necessarily required to be applied to the bands 1 of a wristwatch, and may be applied to a band of a handbag and the like.

While the present invention has been described with reference to the preferred embodiments, it is intended that the invention be not limited by any of the details of the description therein but includes all the embodiments which fall within the scope of the appended claims.

What is claimed is:

1. A manufacturing method of a molded article, comprising:
    a first step of arranging a primary molded article made of a soft material in a molding die such that an outer peripheral surface of an exposed section of the primary molded article which is exposed to outside without being embedded in a secondary molded article corresponds to an inner peripheral surface of the molding die;
    a second step of pressing and deforming an outer peripheral portion of the primary molded article arranged in the molding die by a pressing section so as to bring the outer peripheral surface of the exposed section into close contact with the inner peripheral surface of the molding die; and
    a third step of molding the secondary molded article by withdrawing the pressing section from inside the molding die while injecting resin to be the secondary molded article into the molding die.

2. The manufacturing method according to claim 1, wherein the outer peripheral portion of the primary molded article has a shape by which the outer peripheral portion pressed by the pressing section is deformed such that the outer peripheral surface of the exposed section comes in close contact with the inner peripheral surface of the molding die.

3. The manufacturing method according to claim 2, wherein the primary molded article comprises the exposed section which is exposed to the outside of the secondary molded article and an embedded section which is embedded in the secondary molded article,
    wherein the outer peripheral surface of the exposed section is provided with first inclined sections which correspond to the inner peripheral surface of the molding die, and
    wherein an outer peripheral surface of the embedded section is provided with second inclined sections which are opposite in orientation to the first inclined sections and by which the outer peripheral portion of the primary molded article expands laterally when pressed by the pressing section.

4. The manufacturing method according to claim 3, wherein each first inclined section of the exposed section comprises:
a first contact inclination surface which is a part of the outer peripheral surface of the exposed section and corresponds to and comes in close contact with a part of the inner peripheral surface of the molding die when the primary molded article is arranged in the molding die; and
a second contact inclination surface which secures a space between the outer peripheral surface of the exposed section and the inner peripheral surface of the molding die when the primary molded article is arranged in the molding die.

5. The manufacturing method according to claim 3, wherein the molding die comprises a first die and a second die,
wherein the first die has an attachment recessed section which is provided in an inner surface thereof and in which the exposed section of the primary molded article is arranged with a space, and
wherein the embedded section of the primary molded article is arranged projecting into an internal molding space surrounded by the first die and the second die.

6. The manufacturing method according to claim 4, wherein the molding die comprises a first die and a second die,
wherein the first die has an attachment recessed section which is provided in an inner surface thereof and in which the exposed section of the primary molded article is arranged with a space, and
wherein the embedded section of the primary molded article is arranged projecting into an internal molding space surrounded by the first die and the second die.

7. The manufacturing method according to claim 5, wherein the attachment recessed section of the first die has die inclination sections which are provided on an inner peripheral surface thereof and correspond to the first inclined sections of the exposed section of the primary molded article.

8. The manufacturing method according to claim 6, wherein the attachment recessed section of the first die has die inclination sections which are provided on an inner peripheral surface thereof and correspond to the first inclined sections of the exposed section of the primary molded article.

9. The manufacturing method according to claim 7, wherein each die inclination section comprises:
a reception inclination surface which is provided corresponding to one of the first contact inclination surfaces of the exposed section of the primary molded article and receives deformation of the outer peripheral portion of the primary molded article, and
a molding inclination surface to which one of the second contact inclination surfaces of the exposed section of the primary molded article corresponds with the space therebetween and with which the second contact inclination surface comes in close contact when the outer peripheral portion of the primary molded article is pressed and deformed.

10. The manufacturing method according to claim 8, wherein each die inclination section comprises:
a reception inclination surface which is provided corresponding to one of the first contact inclination surfaces of the exposed section of the primary molded article and receives deformation of the outer peripheral portion of the primary molded article, and
a molding inclination surface to which one of the second contact inclination surfaces of the exposed section of the primary molded article corresponds with the space therebetween and with which the second contact inclination surface comes in close contact when the outer peripheral, portion of the primary molded article is pressed and deformed.

11. The manufacturing method according to claim 5, wherein the pressing section presses the embedded section of the primary molded article toward the first die by being pushed from the second die side into the molding space so as to be able to appear inside the molding space, and presses the outer peripheral surface of the exposed section of the primary molded article against the inner peripheral surface of the attachment recessed section of the first die.

12. The manufacturing method according to claim 7, wherein the pressing section presses the embedded section of the primary molded article toward the first die by being pushed from the second die side into the molding space so as to be able to appear inside the molding space, and presses the outer peripheral surface of the exposed section of the primary molded article against the inner peripheral surface of the attachment recessed section of the first die.

13. The manufacturing method according to claim 9, wherein the pressing section presses the embedded section of the primary molded article toward the first die by being pushed from the second die side into the molding space so as to be able to appear inside the molding space, and presses the outer peripheral surface of the exposed section of the primary molded article against the inner peripheral surface of the attachment recessed section of the first die.

14. The manufacturing method according to claim 1, wherein the third step withdraws the pressing section from inside the molding die when the resin injected into the melding die reaches areas around the embedded section of the primary molded article arranged in the molding die.

15. The manufacturing method according to claim 2, wherein the third step withdraws the pressing section from inside the molding die when the resin injected into the molding die reaches areas around the embedded section of the primary molded article arranged in the molding die.

16. The manufacturing method according to claim 3, wherein the third step withdraws the pressing section from inside the molding die when the resin injected into the molding die reaches areas around the embedded section of the primary molded article arranged in the molding die.

* * * * *

UNITED STATES PATENT AND TRADEMARK OFFICE
CERTIFICATE OF CORRECTION

Page 1 of 1

PATENT NO. : 11,077,589 B2
APPLICATION NO. : 16/297638
DATED : August 3, 2021
INVENTOR(S) : Tanabe et al.

It is certified that error appears in the above-identified patent and that said Letters Patent is hereby corrected as shown below:

In the Claims

Column 16, Line 16 (Claim 10), delete "peripheral," and insert --peripheral--.

Column 16, Line 45 (Claim 14), delete "melding" and insert --molding--.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*